(12) United States Patent
Nentwig et al.

(10) Patent No.: US 8,750,362 B2
(45) Date of Patent: Jun. 10, 2014

(54) METHOD AND APPARATUS FOR RADIO RECEIVER EQUALIZATION

(75) Inventors: Markus Nentwig, Helsinki (FI); Aarno Parssinen, Espoo (FI)

(73) Assignee: Broadcom Corporation, Irvine, CA (US)

( * ) Notice: Subject to any disclaimer, the term of this patent is extended or adjusted under 35 U.S.C. 154(b) by 353 days.

(21) Appl. No.: 13/289,482

(22) Filed: Nov. 4, 2011

(65) Prior Publication Data

US 2013/0114662 A1    May 9, 2013

(30) Foreign Application Priority Data

Nov. 3, 2011    (GB) .................................. 1119000.6

(51) Int. Cl.
*H03H 7/30*    (2006.01)
*H03H 7/40*    (2006.01)
*H03K 5/159*   (2006.01)

(52) U.S. Cl.
USPC ........... 375/229; 375/232; 375/233; 375/316; 375/324; 375/350

(58) Field of Classification Search
USPC .......... 375/229, 232, 233, 316, 324, 340, 350
See application file for complete search history.

(56) References Cited

U.S. PATENT DOCUMENTS

| 6,192,070 | B1* | 2/2001 | Poon et al. ................. 375/222 |
| 7,254,198 | B1  | 8/2007 | Manickam et al. |
| 7,263,133 | B1* | 8/2007 | Miao ......................... 375/267 |
| 7,545,859 | B2  | 6/2009 | Reichard |
| 8,259,832 | B2* | 9/2012 | Feher ......................... 375/261 |
| 2005/0232135 | A1* | 10/2005 | Mukai et al. ................. 370/208 |
| 2010/0119019 | A1  | 5/2010 | Ito |

FOREIGN PATENT DOCUMENTS

WO    WO 2009/106494 A1    9/2009

OTHER PUBLICATIONS

Search and Examination Report for Great Britain Application No. 1119000.6, dated Feb. 10, 2012.
International Search Report and Written Opinion for Application No. PCT/IB2012/056119; dated Apr. 19, 2013.

* cited by examiner

*Primary Examiner* — Ted Wang
(74) *Attorney, Agent, or Firm* — Stanton IP Law

(57) ABSTRACT

A method, apparatus and computer program product are configured to provide calibration accuracy in an analog filter. In this regard, a method is provided that includes estimating a cutoff frequency for an analog filter. The method further includes causing a filter tuning word to be modified based on the estimated cutoff frequency for the analog filter. The method also includes determining a residual cutoff frequency mismatch for the analog filter. The method also includes causing an equalizer configuration to be selected for a digital filter based on the determined residual cutoff frequency mismatch.

20 Claims, 6 Drawing Sheets

METHOD AND APPARATUS FOR RADIO RECEIVER EQUALIZATION

TECHNOLOGICAL FIELD

Embodiments of the present invention relate generally to communications technology and, more particularly, to radio receiver equalization and/or calibration.

BACKGROUND

A direct conversion receiver down converts a radio-frequency to a baseband. The baseband signal is then generally filtered using an analog filter to suppress unwanted signal components such as adjacent channels and/or the like. However, in use, an analog-baseband filter (analog filter) may cause unwanted distortion to a signal (e.g. amplitude ripple, group delay ripple and/or the like). A digital equalizer may be used to compensate for unwanted distortion introduced by the analog filter.

In some cases an analog filter is constructed using electronic components such as resistors and capacitors on an integrated circuit. Each of these components may be manufactured with a certain tolerance caused by variations of the semiconductor process. For example, a value, such as a time constant, that is formed by a resistor and a capacitor may vary by 30% or more between production batches, over temperature and even between samples of the same circuit that are located differently on a silicon wafer during the production process. In comparison, telecommunication standards such as long term evolution (LTE), Wideband Code Division Multiple Access (WCDMA) and/or Global System for Mobile Communications (GSM), for example, impose strict limits on signal quality. Typically, the error on the signal must be kept well below 1% at any processing stage. To meet the requirements of communication standards and to obtain a functional device in general, it is necessary to calibrate components during operation of the device. For example, calibration may take place every time the device is turned on, or every time a channel is switched.

A number of methods have been proposed in an effort to provide some characterization of the mismatch of analog component values with very high accuracy. However the proposals have generally suffered from various drawbacks including, for example, implementation limitations that do not allow for correction of filter parameters with the same accuracy (e.g. required number of control bits becomes impracticable).

BRIEF SUMMARY

A method, apparatus and computer program product are therefore provided according to an example embodiment to provide calibration accuracy in an analog filter. In an example embodiment, the method, apparatus and computer program product may be configured to provide tuning that corrects filter parameters by determining a filter tuning word based on analyzed test tones injected through the analog filter. The filter tuning word may then be used when determining a residual cutoff frequency mismatch. The method, apparatus and computer program product may therefore, according to an example embodiment, select an equalizer configuration for a digital filter to correct for any inaccuracy in the analog filter.

In an embodiment a method includes estimating a cutoff frequency for an analog filter. The method further includes causing a filter tuning word to be modified based on the estimated cutoff frequency for the analog filter. The method also includes determining a residual cutoff frequency mismatch for the analog filter. The method also includes causing an equalizer configuration to be selected for a digital filter based on the determined residual cutoff frequency mismatch.

In another embodiment, an apparatus comprising a processor and a memory including software, with the memory and the software configured to, with the processor, cause the apparatus at least to estimate a cutoff frequency for an analog filter. The apparatus is further caused to cause a filter tuning word to be modified based on the estimated cutoff frequency for the analog filter. The apparatus is further caused to determine a residual cutoff frequency mismatch for the analog filter. The apparatus is further caused to cause an equalizer configuration to be selected for a digital filter based on the determined residual cutoff frequency mismatch.

In a further embodiment, a computer program product is provided that includes at least one computer readable non-transitory memory having program code stored thereon with the program code which when executed by an apparatus causes the apparatus at least to estimate a cutoff frequency for an analog filter. A computer program product also includes program code that is further configured to cause a filter tuning word to be modified based on the estimated cutoff frequency for the analog filter. A computer program product also includes program code that is further configured to determine a residual cutoff frequency mismatch for the analog filter. A computer program product also includes program code that is further configured to cause an equalizer configuration to be selected for a digital filter based on the determined residual cutoff frequency mismatch.

In yet another embodiment, an apparatus is provided that includes means for estimating a cutoff frequency for an analog filter. An apparatus further comprises means for causing a filter tuning word to be modified based on the estimated cutoff frequency for the analog filter. An apparatus further comprises means for determining a residual cutoff frequency mismatch for the analog filter. An apparatus further comprises means for causing an equalizer configuration to be selected for a digital filter based on the determined residual cutoff frequency mismatch.

BRIEF DESCRIPTION OF THE DRAWINGS

Figure 1:
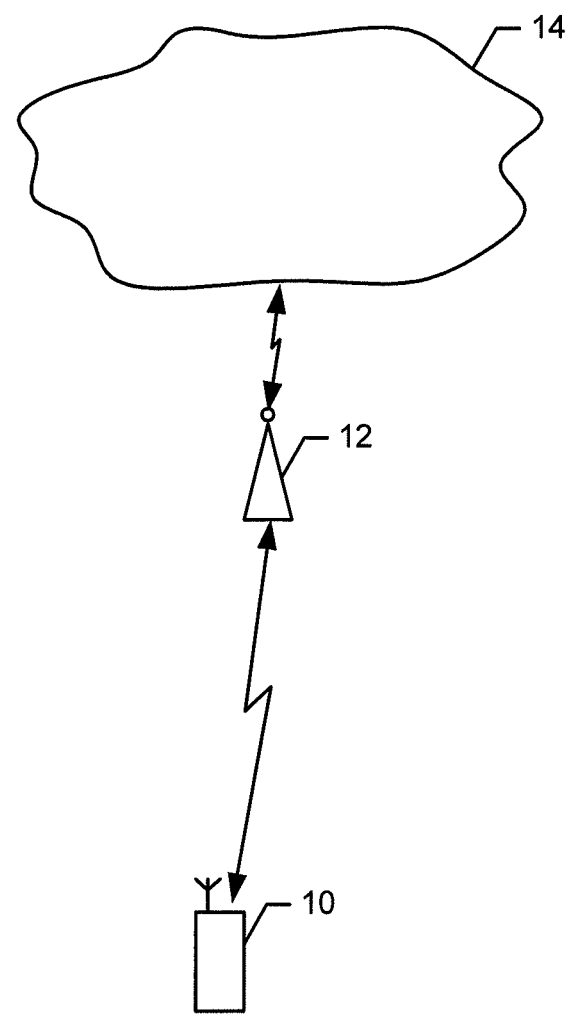
Figure 2:
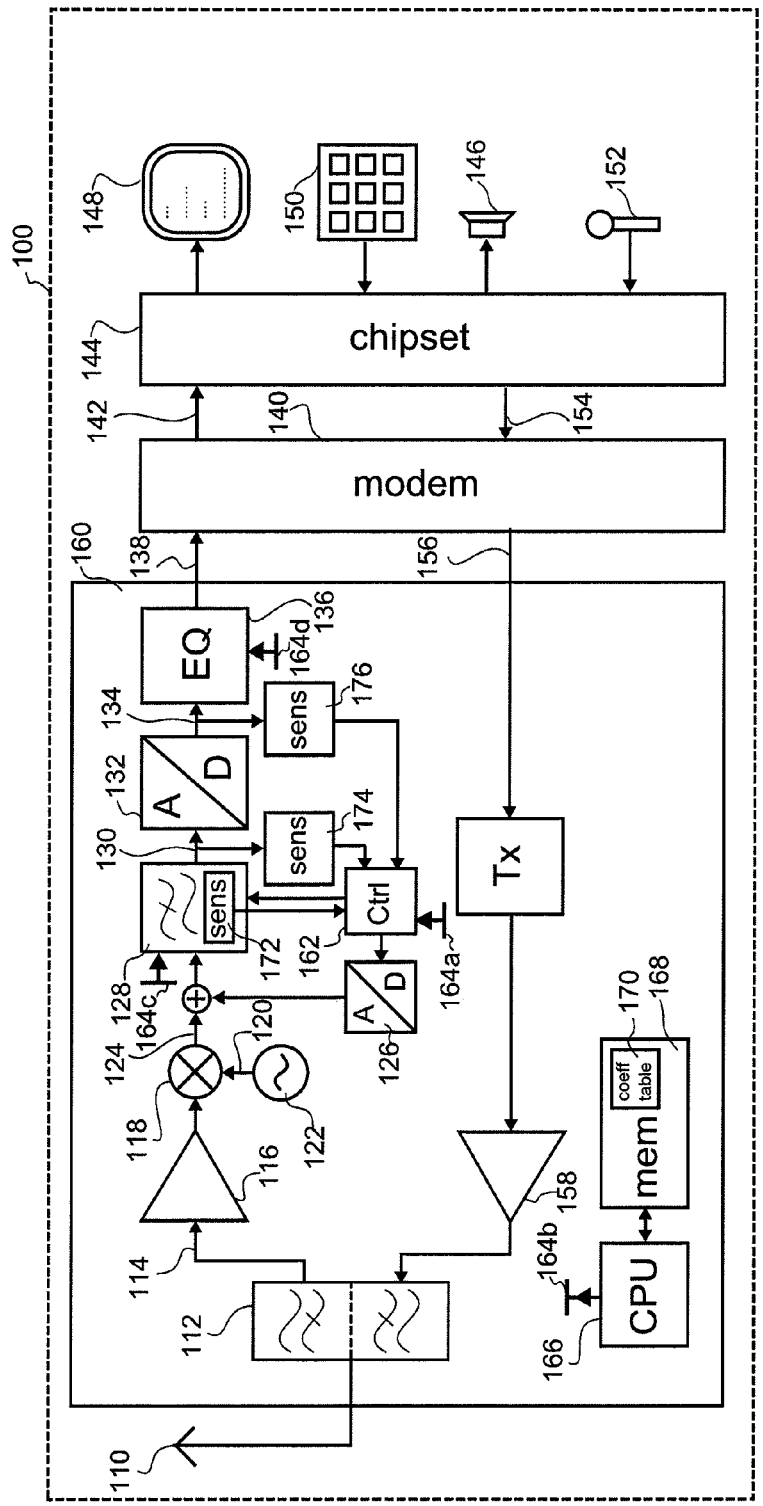
Figure 5:
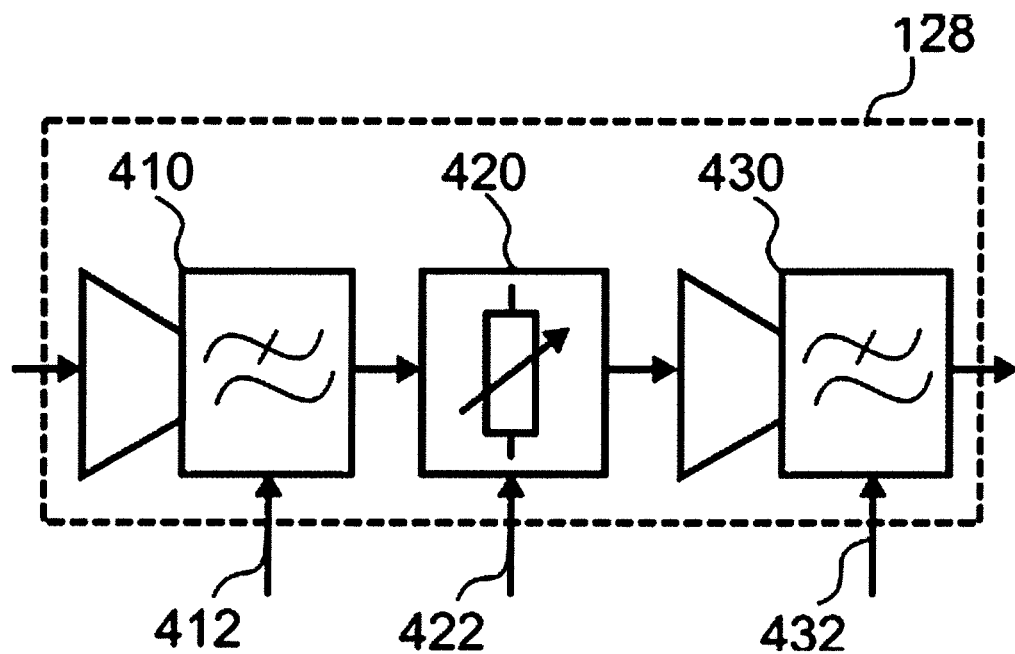
Figure 6:
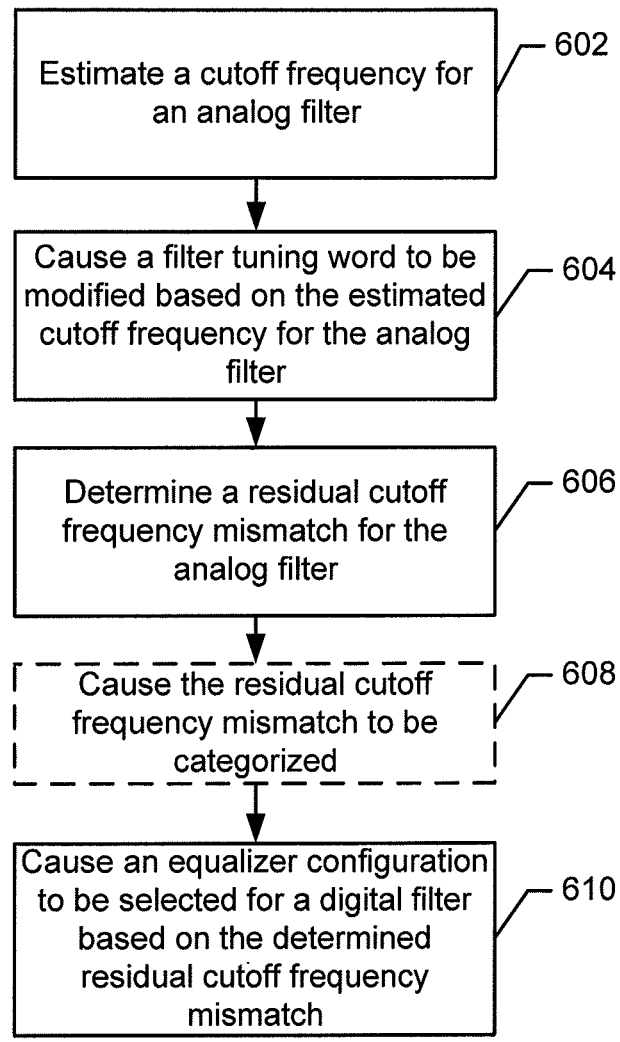

Having thus described the example embodiments of the invention in general terms, reference will now be made to the accompanying drawings, which are not necessarily drawn to scale, and wherein:

FIG. 1 is a schematic representation of a system having a mobile terminal that may benefit from an embodiment of the present invention;

FIG. 2 is a block diagram of an apparatus that may be embodied by a mobile terminal in accordance with one embodiment of the present invention;

FIGS. 3 and 4 illustrate example equalization of an analog filter in accordance with one embodiment of the present invention;

FIG. 5 illustrates a schematic view of an analog filter according to an embodiment of the present invention; and FIG. 6 is a flow chart illustrating operations performed in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Although the method, apparatus and computer program product may be implemented in a variety of different systems, one example of such a system is shown in FIG. 1, which includes a first communication device (e.g., mobile terminal 10) that is capable of communication via an access point 12, such as a base station, a Node B, an evolved Node B (eNB), serving cell or other access point, with a network 14 (e.g., a core network). While the network may be configured in accordance with Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including access point 12, each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE)), may be in communication with other communication devices or other devices via the access point 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processor may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, the mobile terminal 10 may be embodied as or otherwise include an apparatus 100 as generically represented by the block diagram of FIG. 2. While the apparatus 100 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 100 may include or otherwise be in communication with a processor 166 that is configurable to perform actions in accordance with example embodiments described herein. The processor may be configured to perform data processing, application execution and/or other processing and management services according to an example embodiment of the present invention. In some embodiments, the apparatus or the processor may be embodied as a chip or chip set. In other words, the apparatus or the processor may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processor may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processor 166 may be embodied as a circuit chip (e.g., an integrated circuit chip) configured (e.g., with hardware, software or a combination of hardware and software) to perform operations described herein. However, in some embodiments taken in the context of the mobile terminal 10, the processor may be embodied as a portion of a mobile computing device or other mobile terminal.

In an example embodiment, the memory 168 may include one or more non-transitory memory devices such as, for example, volatile and/or non-volatile memory that may be either fixed or removable. The memory may be configured to store information, data, applications, instructions or the like for enabling the apparatus 100 to carry out various functions in accordance with example embodiments of the present invention. For example, the memory could be configured to buffer input data for processing by the processor 166. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor circuitry 166 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 166 may be configured to execute instructions stored in the memory 168 or otherwise accessible to the processor. As such, whether configured by hardware or by a combination of hardware and software, the processor may represent an entity (e.g., physically embodied in circuitry—in the form of processor 166) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Further, the processor 166 may comprise functionality to operate one or more software programs, which may be stored in memory. For example, the processor 166 may be capable of operating a connectivity program, such as a web browser. The connectivity program may allow the apparatus 100 to transmit and receive web content, such as location-based content, according to a protocol, such as Wireless Application Protocol (WAP), hypertext transfer protocol (HTTP), and/or the like. The apparatus 100 may be capable of using a Transmission Control Protocol/Internet Protocol (TCP/IP) to transmit and receive web content across the internet or other networks.

In an embodiment, the apparatus 100 may include a transceiver 160 having a radio frequency transmitter and a receiver implemented completely or in parts in a radio frequency implemented circuit (RFIC). For example, typically a power amplifier and a duplex filter 112 may be external components to the RFIC implementation of the transceiver 160. The RFIC may be an ASIC that is implemented on a semiconductor process such as 32 nanometer complementary metal oxide-semiconductor (CMOS). For example, an analog filter 128 is implemented using components of the semiconductor process.

In an embodiment, the mobile wireless device 100 may be configured to receive a radio frequency signal from antenna 110 via a duplex filter 112. The signal, once received, may be amplified in low-noise amplifier 116 and down converted to baseband in a mixer 118 using local oscillator signal 120. The local oscillator may be generated by a synthesizer 122. Baseband signal 124 may also comprise an in-phase and a quadrature component. Alternatively or additionally, processing may be implemented on separate in-phase and quadrature branches. A digital-to-analog converter 126 may add a constant offset to baseband signal 124, such as for use in direct current offset compensation.

In an embodiment, a baseband signal, such as baseband signal 124, may be filtered using an analog filter 128. Once the baseband signal 124 is filtered, such as for example signal 130, it may be digitized in analog-to-digital converter 132. The resulting digital received signal may then be equalized in digital equalizer 136, for example the signal may be equalized using a finite impulse response (FIR) filter. Once the signal is equalized, such as equalized signal 138, it may then be provided to modem 140. The modem 140 is configured to manipulate the equalized signal into a receive data stream, such as received data stream 142. Receive data stream 142 is routed via chipset 144 for example to loudspeaker 146 in a voice call or interacts with an application running on chipset that processes input and output via display 148 and keypad 150, for example. In a voice call, a voice signal from microphone 152 is converted to a transmit data stream 154, modulated to a transmit signal 156, up converted to radio frequency and amplified by power amplifier 158 for transmission via antenna 110 after passing through duplex filter 112.

In an embodiment, control block 162 may control the calibration of analog filter 128. The control block 162 may be connected via bus interface 164a and 164b with the processor 166. The processor 166 may be configured to initiate the calibration performed by control block 162. Processor 166 may also be configured to control the analog filter 128 via a bus interface, such as bus interface 164c, by, for example, setting the correct bandwidth in analog filter 128 for the received signal. The processor 166 may also be configured to control a digital equalizer 136 via bus interface 164d, for example by uploading a coefficient table 170 from memory 168 to the digital equalizer 136.

In an instance in which analog filter 128 is calibrated, for example by the systems and methods as described herein, the control block 162 may request a sensing result. A sensing result is, for example, a measured resistance-capacitance time constant from a first sensing circuit 172 that forms part of analog filter 128. A control circuit 162 may then adjust the parameters (e.g. a cutoff frequency) in analog filter 128.

Alternatively or additionally, control block 162 may inject a test tone via the digital-to-analog converter 126 into then analog filter 128, and further may be configured to sense the output signal via second sensing circuit 172 in an analog domain or via digital sensing block 176 in the digital domain. For example, control block 162 may inject a test tone at a predetermined test frequency, measure the magnitude of the frequency response of analog filter 128, and adjust a quality factor (e.g. tuning word) of a biquad stage in analog filter 128 based on the result.

Figure 3A:
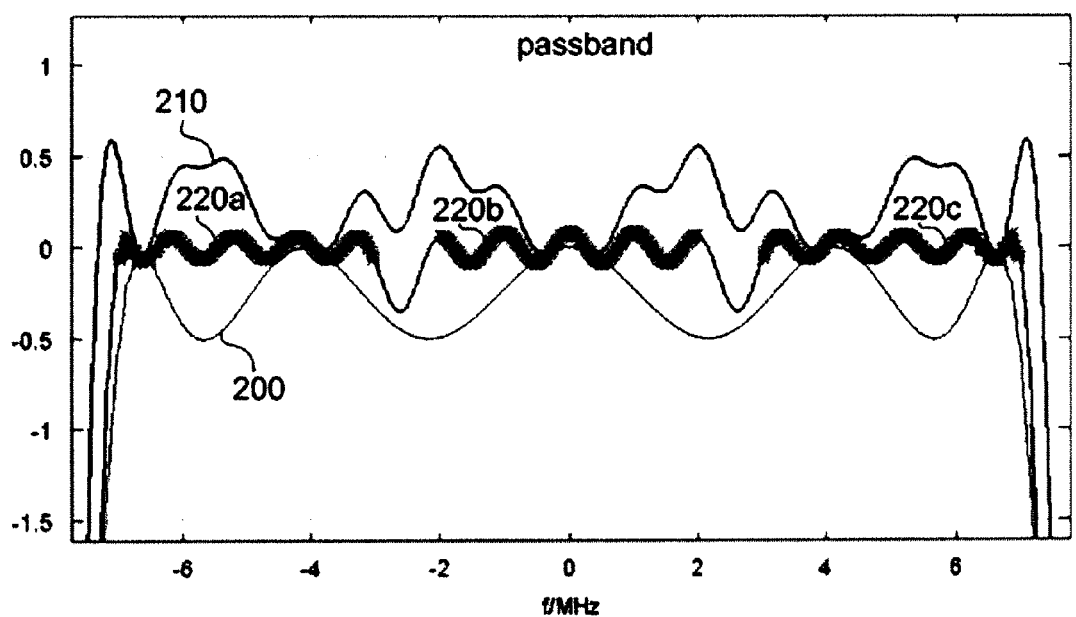
Figure 3B:
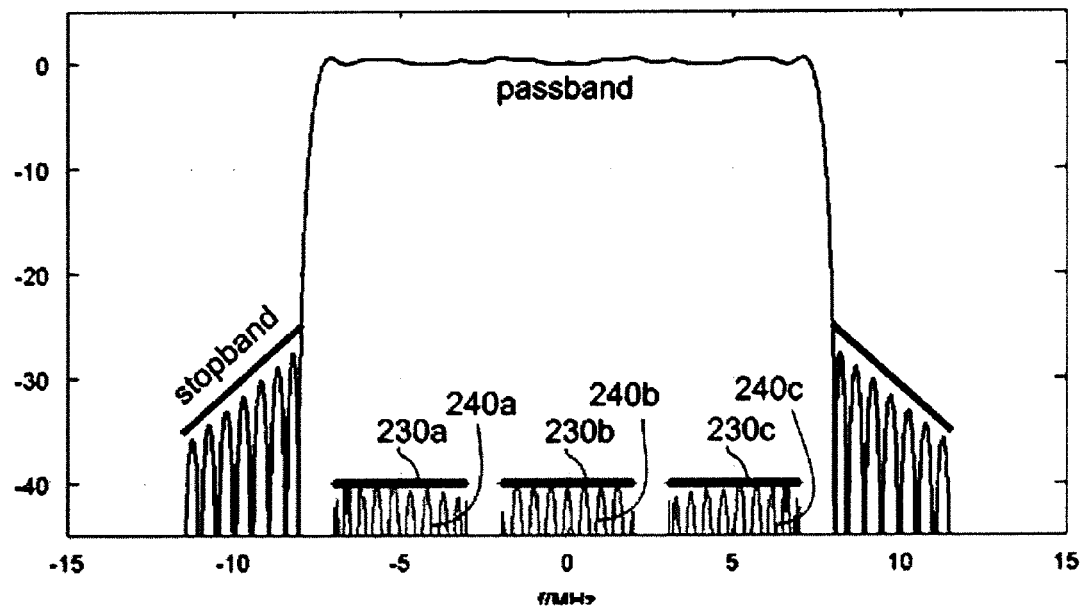

FIGS. 3a-3b illustrates example equalization of an analog filter. The example equalization is generally applicable for a triple carried High-Speed Downlink Packet Access HSDPA (e.g. WCDMA). By way of example and as is shown with reference to FIG. 3a, a nominal analog filter response is shown with reference to trace 200. Such a nominal analog filter frequency response may be produced by example analog filter 128 of FIG. 2. An equalizer frequency response, which may be caused by the digital equalizer 136 of FIG. 3, is illustrated with trace 210. An equalized frequency response is shown for the first 220a, second 220b and third 220c HSDPA channel. FIG. 3b illustrates the requirements 230a-c and the performance 240a-c of an example equalized filter.

Figure 4A:
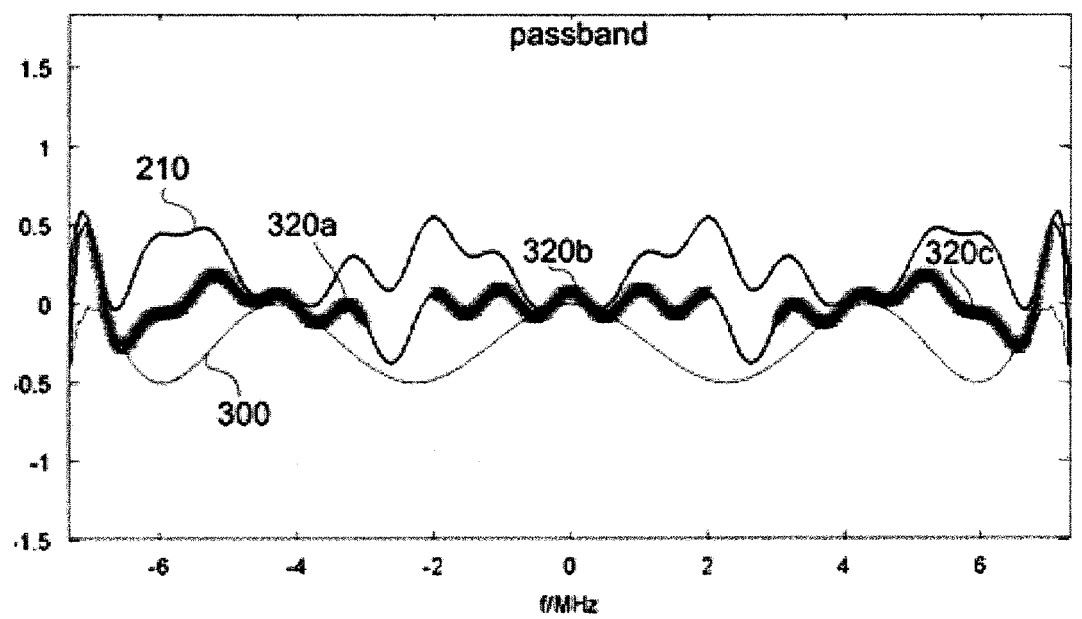
Figure 4B:
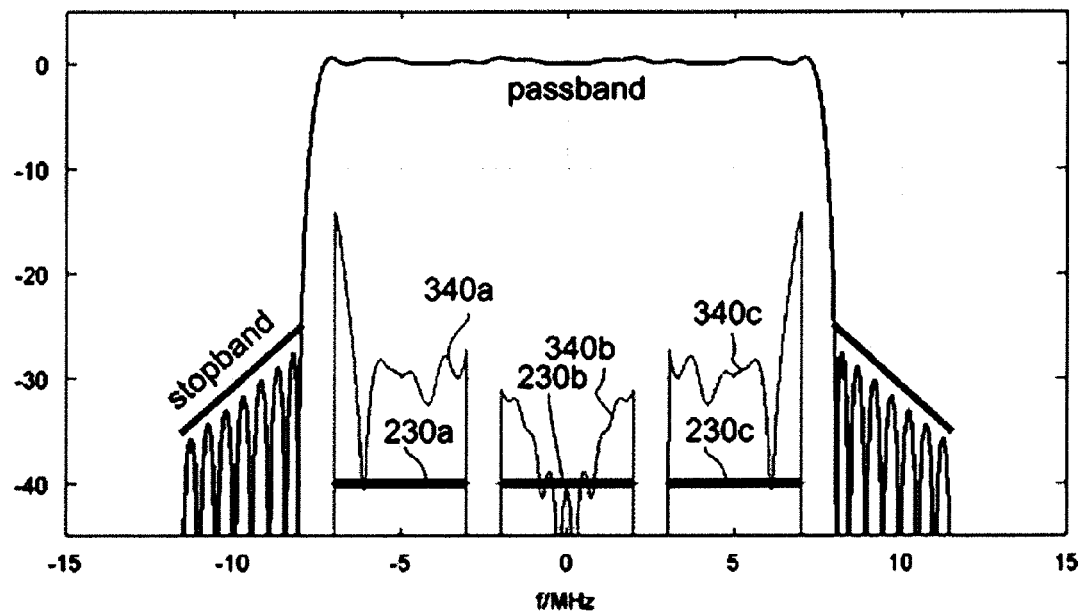

FIGS. 4a-4b illustrates another example equalization of an analog filter. FIGS. 4a-4b assumes an analog filter cut off frequency deviates by 5% from nominal value. FIG. 4a demonstrates an equalizer frequency response is also illustrated with trace 210. Trace 300 demonstrates an example analog filter response with the 5% residual error after a calibration. As is shown with respect to 320a, 320b, and 320c, an equalized filter response is shown. FIG. 4b illustrates filter requirements 230a-c, however shows performance 340a-c that demonstrates performance outside of the requirements.

FIG. 5 illustrates a schematic view of an analog filter, such as analog filter 128, according to an embodiment of the present invention. Analog filter 128 comprises a first active filter stage 410 controlled by a first filter stage tuning word 412. The analog filter 128 may further include a variable gain (e.g. or attenuator) stage 420, that is configured to be controlled by a gain control word 422. A second active filter stage 430 may also be controlled by a second filter stage tuning word 432.

FIG. 6 is a flowchart illustrating the operations performed by a method, apparatus and computer program product, such as apparatus 100 of FIG. 2, from the perspective of a mobile terminal 10 in accordance with one embodiment of the present invention is illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 168 of an apparatus employing an embodiment of the present invention and executed by a processor 166 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 6, when executed, convert a computer or processor into a particular machine configured to perform an example embodiment of the present invention. Accordingly, the operations of FIG. 6 define an algorithm for configuring a computer or processor 166, e.g. to perform an example embodiment. In some cases, a general purpose computer may be provided with an instance of the processor which performs the algorithm of FIG. 6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (an example of which is shown in dashed lines in FIG. 6). It should be appreciated that each of the modifications, optional additions or amplifications below may be included with the operations above either alone or in combination with any others among the features described herein.

Referring now to FIG. 6, the operations of a method, apparatus and computer program product are configured to provide calibration accuracy in an analog filter, such as in analog filter 128. As shown in operation 602, the apparatus 100 may include means, such as the control block 162, the processor 166 or the like, for estimating a cutoff frequency for an analog filter. For example, an analog filter, such as analog filter 128 may be designed with a nominal cutoff frequency such as 2 MHz+k 30 kHz, where k is a tuning word for a cutoff frequency calibration. The apparatus 100, embodied by, for example, the control block 162, the processor 166 or the like may then execute a cutoff frequency estimation algorithm that is configured to determine the cutoff frequency for a particular analog filter, such as analog filter 128. The cutoff frequency estimation algorithm executed by the control block 162, the processor 166 or the like may then cause test tones to be injected at a plurality of test tone frequencies. The test tones may be injected prior to passing through the analog filter, such as analog filter 128. Alternatively or additionally, the cutoff frequency estimation algorithm executed by the control block 162, the processor 166 or the like may measure the magnitude of the injected test tones at a plurality of test tone frequencies after the injected test tones pass through the analog filter. In an embodiment, the cutoff frequency may be estimated by iteratively searching a test tone frequency where gain drops by 3 dB relative to 100 kHz.

As is shown in operation 604, the apparatus 100 may include means, such as the control block 162, the processor 166 or the like, for causing a filter tuning word to be modified based on the estimated cutoff frequency for the analog filter. For example the filter tuning word k may be modified in an instance in which the estimated cutoff frequency is closest to a nominal cutoff frequency.

As is shown in operation 606 and once the filter tuning word has been modified, the apparatus 100 may include means, such as the control block 162, the processor 166 or the like, for determining a residual cutoff frequency mismatch for the analog filter. The residual cutoff frequency mismatch o may then be categorized such as by the control block 162, the processor 166 or the like. See operation 608. The residual cutoff frequency mismatch o is categorized into at least one of the categories m defined by o<15 kHz m=0, −15 kHz<=o<5 kHz m=1, −5 kHz<=o<5 kHz m=2, or 15 kHz<=o m=3. In alternate embodiments, other frequency ranges may be used for residual cutoff frequency mismatch categorization.

The control block 162, the processor 166 or the like may cause an equalizer configuration to be selected for a digital filter based on the residual cutoff frequency mismatch m. As a result, an equalizer configuration may be chosen that best compensates for the determined residual cutoff frequency mismatch. In an embodiment, the equalizer configuration may further be selected based on a gain control word, such as the gain control word 422 of the analog filter 128. In an embodiment, values for the gain control word may include 0 . . . 3, corresponding to 0, −6, −12, −18 dB gain steps. For example in an instance in which the gain control word was equal to a predetermined value (e.g. zero), then an offset may be added to the residual cutoff frequency mismatch prior to categorization as is shown with respect to operation 608. In an embodiment, the equalizer may be a finite-impulse response (FIR) filter and thus an equalizer configuration may be set to tap coefficients.

Many modifications and other embodiments of the inventions set forth herein will come to mind to one skilled in the art That which is claimed:

1. A method comprising:
   estimating a cutoff frequency for an analog filter;
   causing a filter tuning word to be modified based on the estimated cutoff frequency for the analog filter;
   determining a residual cutoff frequency mismatch for the analog filter; and
   causing an equalizer configuration to be selected for a digital filter based on the determined residual cutoff frequency mismatch.

2. A method of claim 1 wherein estimating the cutoff frequency further comprises:
   causing test tones to be injected at a plurality of test tone frequencies, the test tones to be injected prior to passing through the analog filter; and
   measuring the magnitude of the injected test tones at a plurality of test tone frequencies after the injected test tones pass through the analog filter.

3. A method of claim 2 wherein estimating the cutoff frequency further comprises iteratively searching a test tone frequency where gain drops by 3 dB relative to 100 kHz.

4. A method of claim 1, wherein an equalizer configuration is chosen that best compensates for the determined residual cutoff frequency mismatch.

5. A method of claim 1 further comprises causing the residual cutoff frequency mismatch to be categorized; and causing the equalizer configuration to be selected based on the categorized residual cutoff frequency mismatch.

6. A method of claim 5, wherein a residual cutoff frequency mismatch o is categorized into at least one of the categories defined by $o<15$ kHz, $-15$ kHz$<=o<5$ kHz, $-5$ kHz$<=o<5$ kHz or $15$ kHz$<=o$.

7. A method of claim 1 wherein in an instance in which a gain control word is equal to a predetermined value, then an offset may be added to the categorized residual cutoff frequency mismatch.

8. An apparatus comprising:
   a processor and
   a memory including software, the memory and the software configured to, with the processor, cause the apparatus to at least:
   estimate a cutoff frequency for an analog filter;
   cause a filter tuning word to be modified based on the estimated cutoff frequency for the analog filter;
   determine a residual cutoff frequency mismatch for the analog filter; and
   cause an equalizer configuration to be selected for a digital filter based on the determined residual cutoff frequency mismatch.

9. An apparatus according to claim 8 wherein the at least one memory including the computer program code is further configured to, with the at least one processor, cause the apparatus to:
   cause test tones to be injected at a plurality of test tone frequencies, the test tones to be injected prior to passing through the analog filter; and
   measure the magnitude of the injected test tones at a plurality of test tone frequencies after the injected test tones pass through the analog filter to estimate the cutoff frequency.

10. An apparatus according to claim 9 wherein the at least one memory including the computer program code is further configured to, with the at least one processor, cause the apparatus to iteratively search a test tone frequency where gain drops by 3 dB relative to 100 kHz.

11. An apparatus according to claim 8, wherein an equalizer configuration is chosen that best compensates for the determined residual cutoff frequency mismatch.

12. An apparatus according to claim 8 wherein the at least one memory including the computer program code is further configured to, with the at least one processor, cause the apparatus to cause the residual cutoff frequency mismatch to be categorized; and cause the equalizer configuration to be selected based on the categorized residual cutoff frequency mismatch.

13. An apparatus according to claim 12, wherein a residual cutoff frequency mismatch o is categorized into at least one of the categories defined by $o<15$ kHz, $-15$ kHz$<=o<5$ kHz, $-5$ kHz$<=o<5$ kHz or $15$ kHz$<=o$.

14. An apparatus according to claim 8 wherein in an instance in which a gain control word is equal to a predetermined value, then an offset may be added to the categorized residual cutoff frequency mismatch.

15. A computer program product comprising:
   at least one computer readable non-transitory memory medium having program code stored thereon, the program code which when executed by an apparatus cause the apparatus at least to:
   estimate a cutoff frequency for an analog filter;
   cause a filter tuning word to be modified based on the estimated cutoff frequency for the analog filter;
   determine a residual cutoff frequency mismatch for the analog filter; and
   cause an equalizer configuration to be selected for a digital filter based on the determined residual cutoff frequency mismatch.

16. A computer program product according to claim 15, further comprising program code instructions to:
   cause test tones to be injected at a plurality of test tone frequencies, the test tones to be injected prior to passing through the analog filter; and
   measure the magnitude of the injected test tones at a plurality of test tone frequencies after the injected test tones pass through the analog filter to estimate the cutoff frequency.

17. A computer program product according to claim 16 further comprising program code instructions to iteratively search a test tone frequency where gain drops by 3 dB relative to 100 kHz.

18. A computer program product according to claim 15, wherein an equalizer configuration is chosen that best compensates for the determined residual cutoff frequency mismatch.

19. A computer program product according to claim 15 further comprising program code instructions to cause the residual cutoff frequency mismatch to be categorized; and cause the equalizer configuration to be selected based on the categorized residual cutoff frequency mismatch.

20. A computer program product according to claim 15 wherein in an instance in which a gain control word is equal to a predetermined value, then an offset may be added to the categorized residual cutoff frequency mismatch.

* * * * *